US012800779B2

(12) United States Patent
Lu et al.

(10) Patent No.: US 12,800,779 B2
(45) Date of Patent: Nov. 17, 2026

(54) PIXEL SENSOR CIRCUIT

(71) Applicant: InnoCare Optoelectronics Corporation, Tainan City (TW)

(72) Inventors: Hui-Hsin Lu, Tainan City (TW); Zong-Yi Hsiao, Tainan City (TW); Jheng-You Lin, Tainan City (TW); Hsin-Han Shen, Tainan City (TW)

(73) Assignee: InnoCare Optoelectronics Corporation, Tainan City (TW)

( * ) Notice: Subject to any disclaimer, the term of this patent is extended or adjusted under 35 U.S.C. 154(b) by 249 days.

(21) Appl. No.: 18/663,077

(22) Filed: May 14, 2024

(65) Prior Publication Data

US 2025/0004148 A1 Jan. 2, 2025

(30) Foreign Application Priority Data

Jun. 27, 2023 (TW) ................................ 112123768

(51) Int. Cl.
*G01T 1/24* (2006.01)

(52) U.S. Cl.
CPC .................................... *G01T 1/247* (2013.01)

(58) Field of Classification Search
None
See application file for complete search history.

(56) References Cited

U.S. PATENT DOCUMENTS

| | | | | |
|---|---|---|---|---|
| 6,163,029 | A * | 12/2000 | Yamada | H04N 25/76 250/370.01 |
| 6,185,274 | B1 * | 2/2001 | Kinno | H04N 25/77 378/57 |
| 9,195,899 | B2 * | 11/2015 | Topfer | H04N 25/68 |
| 10,390,783 | B2 | 8/2019 | Hawver et al. | |
| 2023/0400353 | A1 * | 12/2023 | Ren | G01J 1/44 |

* cited by examiner

*Primary Examiner* — Hoon K Song
(74) *Attorney, Agent, or Firm* — JCIPRNET

(57) ABSTRACT

Disclosed is a pixel sensor circuit including a photodiode element and a transistor element. The photodiode element is configured to sense an X-ray to generate a photocurrent signal. The photodiode element has a first end and a second end. A bias voltage is applied to the first end of the photodiode element. The transistor element is coupled to the second end of the photodiode element. The transistor element is configured to control the photocurrent signal to be read out. The voltage value of the bias voltage is adjusted according to the intensity of the X-ray.

20 Claims, 6 Drawing Sheets

PIXEL SENSOR CIRCUIT

CROSS-REFERENCE TO RELATED APPLICATION

This application claims the priority benefit of Taiwan application no. 112123768, filed on Jun. 27, 2023. The entirety of the above-mentioned patent application is hereby incorporated by reference herein and made a part of this specification.

BACKGROUND

Technical Field

The disclosure relates to an electronic circuit, and in particular to a pixel sensor circuit.

Description of Related Art

In the process of dynamic image acquisition, dynamic X-ray devices based on thin film transistors may encounter a problem of image sticking, resulting in poor image quality. Especially when the intensity of the X-ray becomes stronger, it is easy to increase a residual charge of a photodiode element. Therefore, if the residual charge of the photodiode element is not cleared immediately, a delay effect may easily occur in the next image acquisition.

SUMMARY

The disclosure provides a pixel sensor circuit whose bias voltage or reset voltage can be adjusted according to an intensity of an X-ray to reduce a delay effect of image acquisition.

A pixel sensor circuit of the disclosure includes a photodiode element and a transistor element. The photodiode element is configured to sense an X-ray and generate a photocurrent signal. The photodiode element has a first end and a second end. The first end of the photodiode element is applied with a bias voltage. A transistor element is coupled to the second end of the photodiode element. The transistor element is configured to control the photocurrent signal to be read out. A voltage value of the bias voltage is adjusted according to an intensity of the X-ray.

A pixel sensor circuit of the disclosure includes a photodiode element and a transistor element. The photodiode element is configured to sense an X-ray and generate a photocurrent signal. The photodiode element has a first end and a second end. The first end of the photodiode element is coupled to a first voltage. The first transistor element has a first end, a second end, and a control end. The first end of the first transistor element is coupled to the second end of the photodiode element. The second end of the first transistor element is applied with a bias voltage. A voltage value of the bias voltage is adjusted according to an intensity of the X-ray.

A pixel sensor circuit of the disclosure includes a photodiode element and a first transistor element. The photodiode element is configured to sense an X-ray and generate a photocurrent signal. The photodiode element has a first end and a second end. The first end of the photodiode element is coupled to a first voltage. The first transistor element has a first end, a second end, and a control end. The first end of the first transistor element is coupled to the second end of the photodiode element. The second end of the first transistor element is coupled to a second voltage. A voltage of the first end of the first transistor element is regarded as a reset voltage of the photodiode element. A voltage value of the reset voltage is adjusted according to an intensity of the X-ray.

In order to make the aforementioned features and advantages of the disclosure comprehensible, embodiments accompanied with drawings are described in detail below.

DESCRIPTION OF THE EMBODIMENTS

Figure 1:
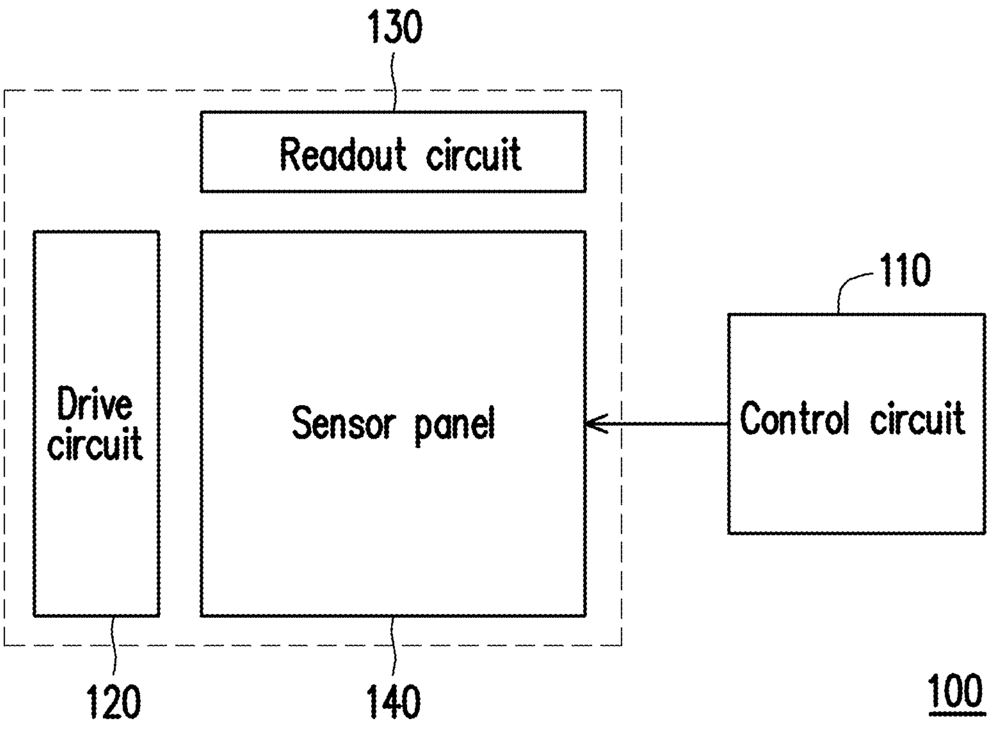
FIG. 1 is a schematic block diagram of an X-ray device of an embodiment of the disclosure.

Reference will now be made in detail to the exemplary embodiments of the disclosure, examples of which are illustrated in the accompanying drawings. Whenever possible, the same reference numerals are used in the drawings and descriptions to represent the same or similar portions. It should be noted that, in order to facilitate understanding and for the concision of the drawings, only a part of the electronic device is shown in the drawings in this disclosure, and the specific elements in the drawings are not drawn according to actual scale. In addition, the number and size of each element in the figure are only exemplary and are not used to limit the scope of the disclosure.

Certain terms are used throughout the specification and the appended claims of the disclosure to refer to particular elements. Those skilled in the art should understand that electronic device manufacturers may refer to the same elements under different names. This specification does not intend to distinguish between elements having the same function but different names. In the following specification and claims, words such as "having" and "including" are open-ended words, so they should be interpreted as meaning "including but not limited to . . . "

In some embodiments of the disclosure, terms such as "connection", "interconnection", etc., regarding bonding and connection, unless specifically defined, may mean that two structures are in direct contact, or that two structures are not in direct contact, and there are other structures located between these two structures. Moreover, the terms of bonding and connecting may also include the case where both structures are movable or both structures are fixed. In addition, the terms "electrically connected" and "coupled" include any direct and indirect electrical connection means.

In the following embodiments, the same or similar elements will be designated by the same or similar reference numerals, and descriptions thereof will be omitted. In addition, as long as the features of different embodiments do not violate or do not conflict with the spirit of the disclosure, they may be mixed and matched arbitrarily, and simple equivalent changes and modifications made according to the specification or the claims are still within the scope of the disclosure. In addition, terms such as "first" and "second" mentioned in the specification or claims are used to name different elements or to distinguish different embodiments or ranges, and are not used to limit the upper limit or the lower limit of the number of elements and are also not used to limit the manufacturing order or arrangement order of the elements.

It should be noted that in the following embodiments, the features of several different embodiments may be replaced, recombined, and mixed to complete other embodiments without departing from the spirit of the disclosure. As long as the features of the embodiments do not violate or do not conflict with the spirit of the disclosure, they may be mixed and matched arbitrarily.

FIG. 1 is a schematic block diagram of an X-ray device of an embodiment of the disclosure. Referring to FIG. 1, an X-ray device 100 may be an X-ray flat panel detector (FPD). For example, the X-ray device 100 may be a digital radiography (DR) system for remote backup. The X-ray device 100 may be a mobile image capturing device and may be configured to obtain a measurement image (such as an X-ray image).

In this embodiment, the X-ray device 100 may first communicate with an electronic device (not shown), where the electronic device may be, for example, a personal computer (PC), a laptop, a tablet, a smart phone, or other devices, and may output or automatically output a control signal to the X-ray device 100 according to the control of the user. For example, when the user needs to use the X-ray device 100 to measure and analyze an X-ray image of a lung measurement area, the user may start the X-ray device 100 and perform connection by the electronic device. The user may operate the electronic device, so that the electronic device may output a corresponding control signal to the X-ray device 100 to set the X-ray device 100 to execute a measurement module corresponding to the lung measurement area.

Figure 2:
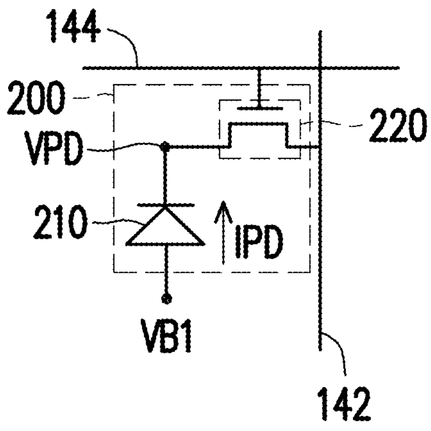
FIG. 2 is a schematic outline diagram of a pixel sensor circuit of the embodiment in FIG. 1.

The X-ray device 100 includes a control circuit 110, a drive circuit 120, a readout circuit 130 and, a sensor panel 140. The control circuit 110 is configured to control the overall measurement operation of the X-ray device 100. The sensor panel 140 includes multiple pixel sensor circuits 200 as shown in FIG. 2. The pixel sensor circuits 200 are arranged on the sensor panel 140 in an array. The drive circuit 120 is configured to drive the sensor panel 140 to perform the measurement operation and obtain a measurement result from the readout circuit 130.

In this embodiment, in a process of dynamic image acquisition of the X-ray device, the control circuit 110 may obtain a light and dark grayscale value of a first image and may automatically feedback control a bias voltage of a photodiode element to effectively neutralize a residual charge, thereby reducing a delay effect of a second image.

In this embodiment, the control circuit 110 may be a central processing unit (CPU) and may communicate with other electronic devices or electronic units by a wired or wireless communication module. For example, the control circuit 110 may be connected to other electronic devices or other electronic units by connecting lines, or the control circuit 110 may communicate with other electronic devices or other electronic units by bluetooth or wifi. Alternatively, the control circuit 110 may be a field programmable gate array (FPGA), a graphics processing unit (GPU), or other suitable elements.

Figure 3:
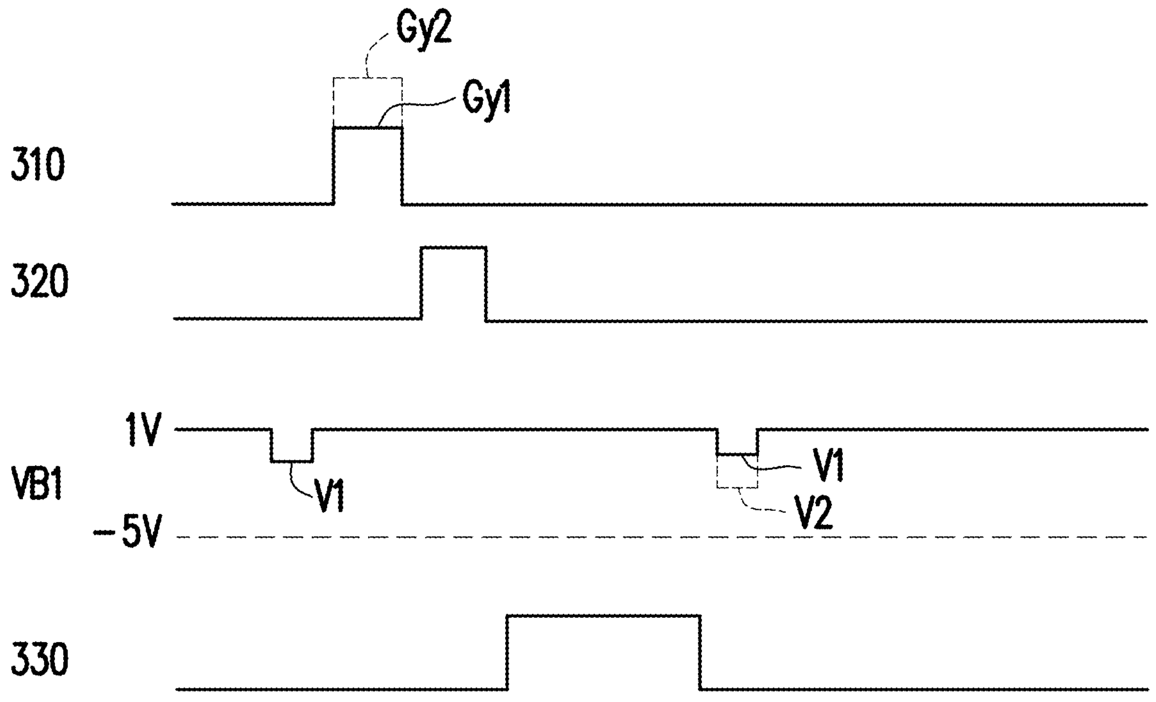
FIG. 3 is a schematic waveform diagram of each signal in an X-ray device of the embodiment in FIG. 1.

FIG. 2 is a schematic outline diagram of a pixel sensor circuit of the embodiment in FIG. 1. FIG. 3 is a schematic waveform diagram of each signal in an X-ray device of the embodiment in FIG. 1. Referring to FIG. 1 to FIG. 3, the pixel sensor circuit 200 includes a photodiode element 210 and a transistor element 220. The photodiode element 210 is configured to sense an X-ray 310 and generate a photocurrent signal IPD. A method that the photodiode element 210 senses the X-ray 310 includes directly receiving the X-ray 310 and being exposed, thereby generating the photocurrent signal IPD. Alternatively, the X-ray 310 first passes through a scintillator layer (a light conversion layer) and is converted into a light waveband that can be sensed by the photodiode element 210. At this time, the photodiode element 210 generates the photocurrent signal IPD.

The transistor element 220 is configured to control the photocurrent signal IPD to be read out. For example, a sensing voltage VPD corresponding to the photocurrent signal IPD is read out by a data line 142 and is outputted to the readout circuit 130. A waveform 310 of the X-ray shown in FIG. 3 represents the intensity of the X-ray, which corresponds to a dose of the X-ray, and a unit of the dose of the X-ray may be expressed in Micro Gray (uGy). A dashed line of the waveform 310 indicates that the intensity of the X-ray becomes stronger from intensity Gy1 to intensity Gy2.

The photodiode element 210 has a first end and a second end. A bias voltage VB1 is applied to the first end of the photodiode element 210. The second end of the photodiode element 210 is coupled to a first end of the transistor element 220. The first end of the photodiode element 210 is an anode. The second end of the photodiode element 210 is a cathode. The transistor element 220 has a first end, a second end, and a control end. The first end of the transistor element 220 is coupled to the second end of photodiode element 210. The second end of the transistor element 220 is coupled to the data line 142 of the sensor panel 140, and the photocurrent signal IPD is read out from the data line 142. The control end of the transistor element 220 is coupled to a scan line 144 of the sensor panel 140.

In FIG. 3, the drive circuit 120 outputs a high-level scan signal 320, so that the transistor element 220 is turned on. Then, during a readout period (a high-level period of a readout signal 330), the readout circuit 130 reads, digitizes, and outputs the photocurrent signal IPD to an image processor (not shown) to form the X-ray image. The image processor may be disposed in the control circuit 110 or other locations of the X-ray device 100.

The first end (the anode) of the photodiode element 210 is applied with the bias voltage VB1. A voltage value of the bias voltage VB1 is adjusted according to the intensity of the X-ray 310. For example, the stronger the intensity of the X-ray 310, the lower the voltage value of the bias voltage VB1. In an embodiment, the voltage value of the bias voltage VB1 may be adjusted between 1 volt and −5 volts according to the intensity of the X-ray 310. This voltage range is not intended to limit the disclosure.

Specifically, in this embodiment, in the process of the dynamic image acquisition of the X-ray device 100, the control circuit 110 may obtain the light and dark grayscale value of the first image. The grayscale value of the first image may be regarded as a basis for sensing the X-ray 310. Then, the control circuit 110 automatically calculates an appropriate bias voltage VB1, which in this example is a voltage value V1. Moreover, the control circuit 110 converts the bias voltage VB1 into an input signal of a programmable power management IC (PMIC), so that the programmable PMIC (not shown) may provide the voltage values of multiple bias voltages VB1. Therefore, the control circuit 110 may regard the grayscale value of the first image as the basis for sensing the X-ray 310 and may adjust the voltage value of the bias voltage VB1 according to the intensity of the X-ray 310 when obtaining the second image.

For example, in FIG. 3, if the intensity of the X-ray 310 is not adjusted after the control circuit 110 obtains the first image and still maintains Gy1, the control circuit 110 determines not to adjust the voltage value of the bias voltage VB1 according to the intensity of the X-ray 310 and still maintains the voltage value of the bias voltage VB1 at V1. On the contrary, if the intensity of the X-ray 310 is enhanced to Gy2 after the control circuit 110 obtains the first image, the control circuit 110 determines to adjust the voltage value of the bias voltage VB1 to V2 according to the intensity of the X-ray 310.

Therefore, the control circuit 110 may automatically feedback control the bias voltage VB1 of the photodiode element 210 to effectively neutralize the residual charge increased in the photodiode element 210 when the intensity of the X-ray 310 becomes stronger, thereby reducing the delay effect of the second image acquisition.

Figure 4A:
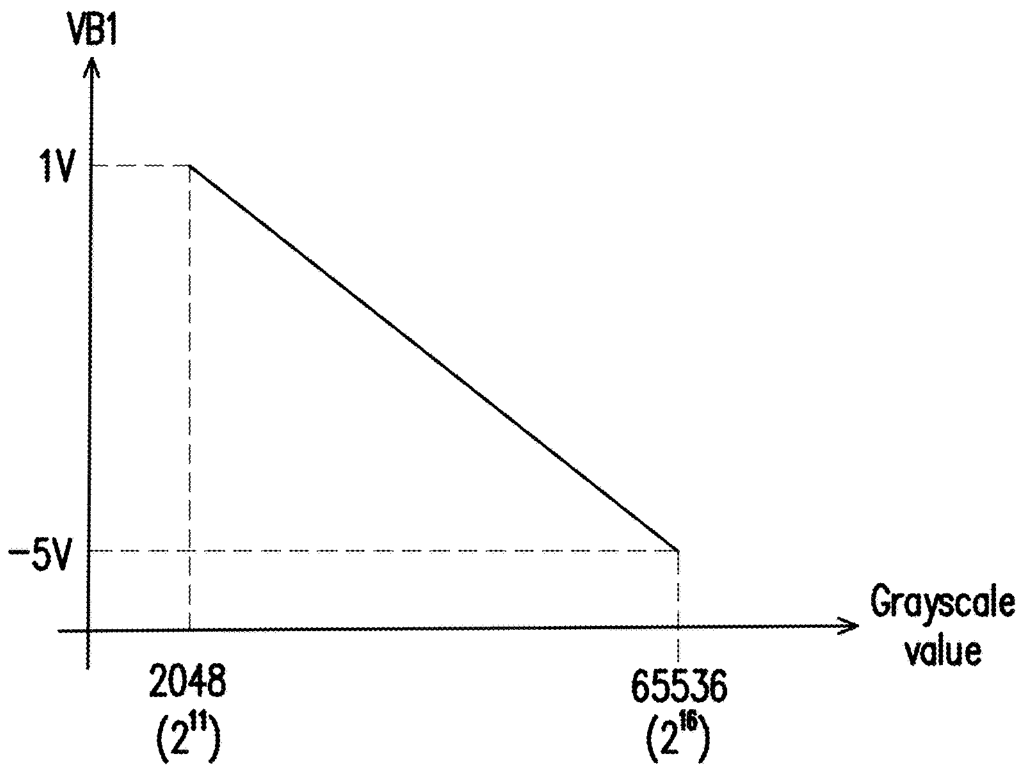
FIG. 4A and FIG. 4B are diagrams showing a corresponding relationship among intensity of an X-ray, an image grayscale value, and a bias voltage of an embodiment of the disclosure.
Figure 4B:
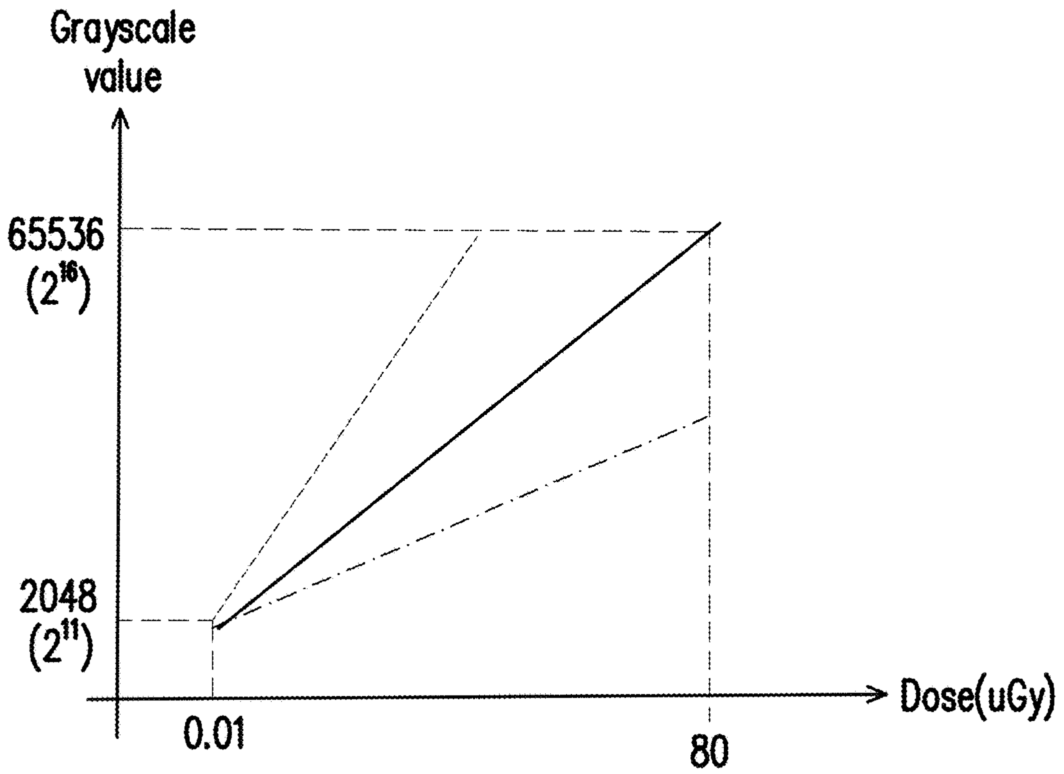

FIG. 4A and FIG. 4B are diagrams showing a corresponding relationship among intensity of an X-ray, an image grayscale value, and a bias voltage of an embodiment of the disclosure. Referring to FIG. 4A and FIG. 4B, the grayscale value of the X-ray image is, for example, represented by a 16-bit digital signal, where a grayscale value 2048 is 2 to the power of 11 times, and a grayscale value 65536 is 2 to the power of 16 times. After the first image acquisition is performed, the control circuit 110 may learn the corresponding relationship among the three parameters of the first image, namely, the intensity of the X-ray, the image grayscale value, and the bias voltage from FIG. 4A and FIG. 4B and may regard the corresponding relationship as a basis. Then, when the second image acquisition is performed, if the intensity of the X-ray changes, the control circuit 110 may learn the corresponding relationship among the three parameters of the second image, namely, the intensity of the X-ray, the image grayscale value, and the bias voltage from FIG. 4A and FIG. 4B and may adjust the bias voltage VB1 applied to the photodiode element 210 accordingly.

The corresponding relationship among the three parameters of the intensity of the X-ray, the image grayscale value, and the bias voltage is shown in FIG. 4A and FIG. 4B, and the respective numerical values of the three parameters are only for illustration, which is not intended to limit the disclosure.

Figure 5:
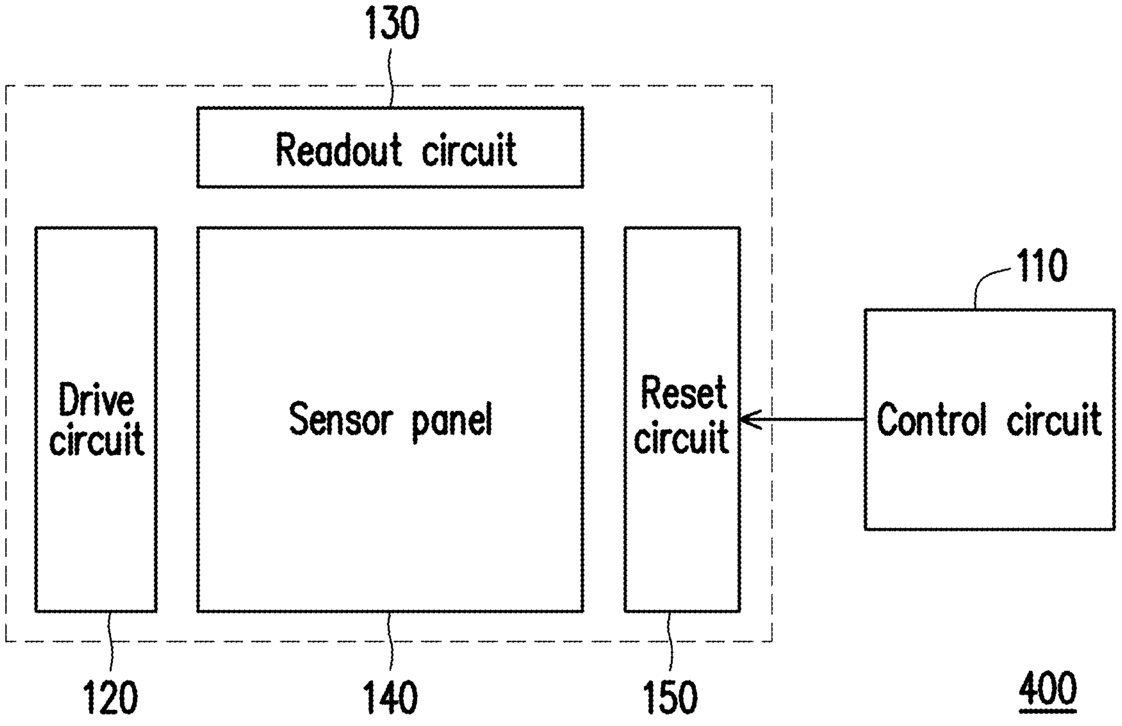
FIG. 5 is a schematic block diagram of an X-ray device of another embodiment of the disclosure.
Figure 6:
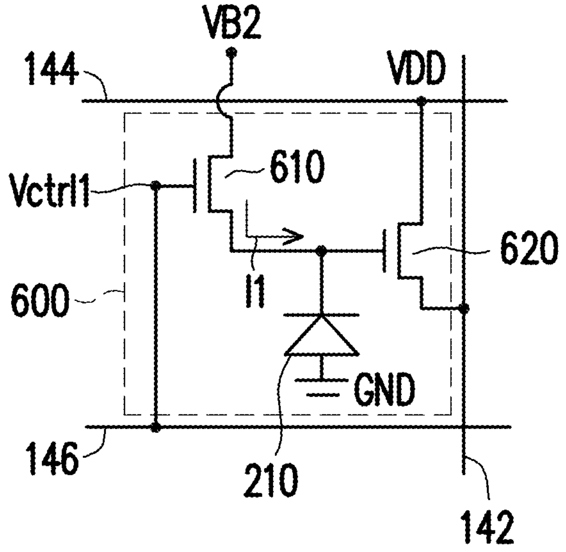
FIG. 6 is a schematic outline diagram of a pixel sensor circuit of the embodiment in FIG. 5.

FIG. 5 is a schematic block diagram of an X-ray device of another embodiment of the disclosure. FIG. 6 is a schematic outline diagram of a pixel sensor circuit of the embodiment in FIG. 5. Referring to FIG. 5 and FIG. 6, an X-ray device 400 of this embodiment is similar to the X-ray device 100 of the embodiment in FIG. 1. However, a main difference between the two lies in that the X-ray device 400 further includes a reset circuit 150. The reset circuit 150 is configured to perform a reset operation on a pixel sensor circuit 600 during the reset period.

The pixel sensor circuit 600 includes a photodiode element 210, a first transistor element 610, and a second transistor element 620. The photodiode element 210 has a first end and a second end. The first end of the photodiode element 210 is coupled to a first voltage GND, for example, a ground voltage. The second end of the photodiode element 210 is coupled to a first end of the first transistor element 610. The first transistor element 610 has a first end, a second end, and a control end. The first end of the first transistor element 610 is coupled to the second end of the photodiode element 210, and the second end of the first transistor element 610 is applied with a bias voltage VB2. The control end of the first transistor element 610 is coupled to a reset line 146. The second transistor element 620 has a first end, a second end, and a control end. The first end of the second transistor element 620 is coupled to the data line 142, and the second end of the second transistor element 620 is coupled to the scan line 144. The control end of the second transistor element 620 is coupled to the second end of the photodiode element 620.

Figure 7:
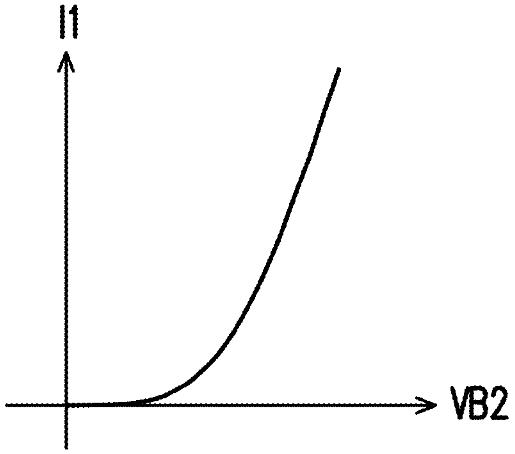
FIG. 7 is a schematic diagram showing a relationship between a bias voltage and a reset current according to an embodiment of the disclosure.

In this embodiment, a voltage value of the bias voltage VB2 is adjusted according to the intensity of the X-ray. For example, the stronger the intensity of the X-ray 310, the lower the voltage value of the bias voltage VB2. The voltage value of the bias voltage VB2 may be adjusted between 1 volt and −5 volts according to the intensity of the X-ray 310. Specifically, during the reset period, a second voltage VDD is applied to the second end of the second transistor element 620 by the scan line 144, and a reset control signal Vctrl1 is applied to the control end of the first transistor element 610 by the reset line 146, so that the first transistor element 610 generates a reset current I1 corresponding to the bias voltage VB2. In this embodiment, a relationship between the bias voltage VB2 and the reset current I1 is shown in FIG. 7. During the reset period, the reset current I1 flows to the photodiode element 210 to neutralize the charge remaining in the photodiode element 210.

Therefore, the control circuit 110 may regard the grayscale value of the first image as the basis for sensing the X-ray 310 and may adjust the voltage value of the bias voltage VB2 according to the intensity of the X-ray 310 when obtaining the second image. For example, if the intensity of the X-ray 310 is not adjusted after the control circuit 110 obtains the first image, the control circuit 110 determines not to adjust the voltage value of the bias voltage VB2 according to the intensity of the X-ray 310. On the contrary, if the intensity of the X-ray 310 is enhanced after the control circuit 110 obtains the first image, the control circuit 110 determines to increase the voltage value of the bias voltage VB2 according to the intensity of the X-ray 310 to increase the reset current I1. The corresponding relationship among the three parameters of the intensity of the X-ray, the image grayscale value, and the bias voltage of this embodiment is shown in FIG. 4A and FIG. 4B.

Therefore, the control circuit 110 may automatically feedback control the bias voltage VB2 of the first transistor element 610 to effectively neutralize the residual charge increased in the photodiode element 210 when the intensity of the X-ray 310 becomes stronger, thereby reducing the delay effect of the second image acquisition.

Figure 8:
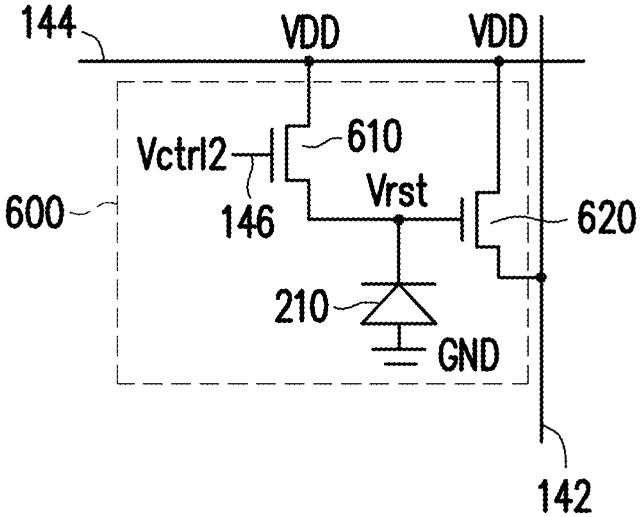
FIG. 8 is a schematic outline diagram of a pixel sensor circuit of another embodiment in FIG. 5.
Figure 9:
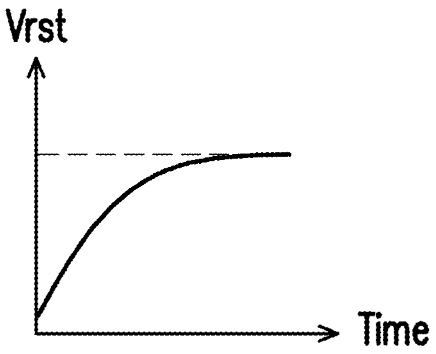
FIG. 9 is a schematic waveform diagram of a reset voltage of the pixel sensor circuit changing with time in FIG. 8.
Figure 10:
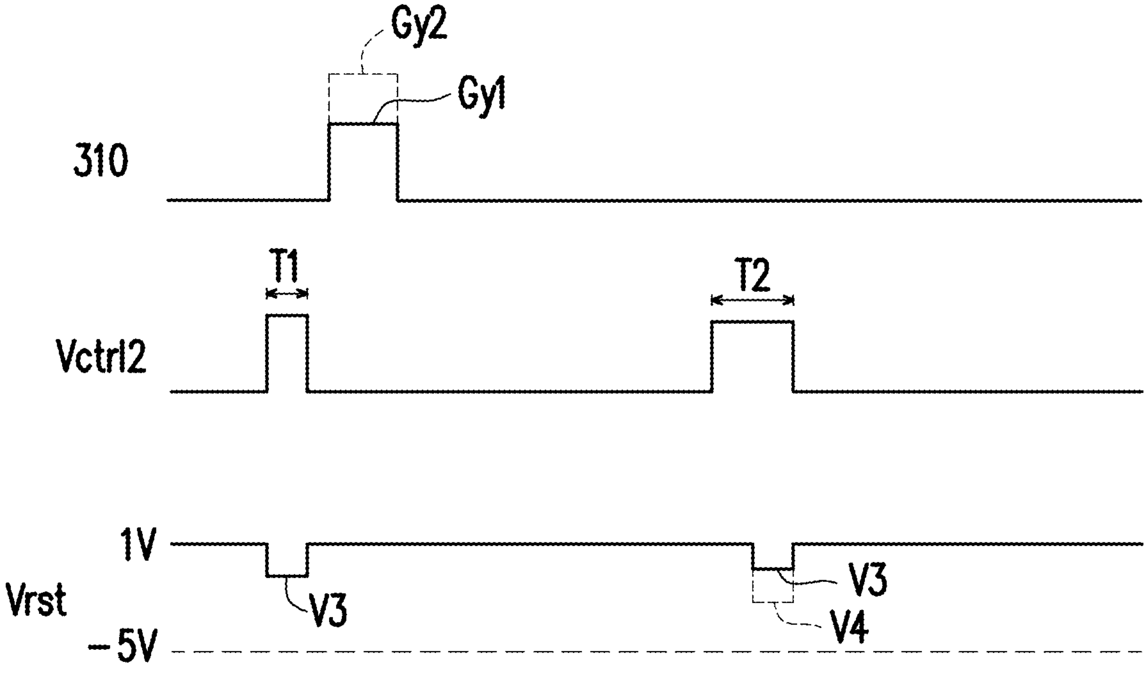
FIG. 10 is a schematic waveform diagram of each signal in the pixel sensor circuit in FIG. 8.

FIG. 8 is a schematic outline diagram of a pixel sensor circuit of another embodiment in FIG. 5. FIG. 9 is a schematic waveform diagram of a reset voltage of the pixel sensor circuit changing with time in FIG. 8. FIG. 10 is a schematic waveform diagram of each signal in the pixel sensor circuit in FIG. 8. Referring to FIG. 8 to FIG. 10, in this embodiment, the control circuit 110 may adjust a pulse width of a reset control signal Vctrl2 according to the intensity of the X-ray 310 to control the time length during which the first transistor element 610 is turned on, thereby determining a voltage value of a reset voltage Vrst. That is, the voltage value of the reset voltage Vrst is adjusted according to the intensity of the X-ray 310. For example, the stronger the intensity of the X-ray 310, the lower the voltage value of the reset voltage Vrst. The voltage value of the reset voltage Vrst may be adjusted between 1 volt and −5 volts according to the intensity of the X-ray 310.

Specifically, the first end of the first transistor element 610 is coupled to the second end of the photodiode element 210, and the second end of the first transistor element 610 is coupled to the scan line 144. During the reset period, the second voltage VDD is applied to the second end of the first transistor element 610 by the scan line 144, and the reset control signal Vctrl2 is applied to the control end of the first transistor element 610 by the reset line 146. When the first transistor element 610 is turned on, the charge from the second voltage VDD may accumulates at the first end of the first transistor element 610 to generate the reset voltage Vrst. In this embodiment, the reset voltage Vrst changes with time as shown in FIG. 9. During the reset period, the reset voltage Vrst is configured to neutralize the charge remaining in the photodiode element 210.

Further, the reset control signal Vctrl2 is applied to the control end of the first transistor element 610 by the reset line 146 to control the turn-on time of the first transistor element 610. When the turn-on time length of the first transistor element 610 is T1, the voltage value corresponding to the reset voltage Vrst is, for example, V3. When the turn-on time length of the first transistor element 610 is increased to T2, the voltage value corresponding to the reset voltage Vrst is, for example, V4. Therefore, the voltage value of the reset voltage Vrst is determined according to the turn-on time of the first transistor element 610, and the turn-on time of the first transistor element 610 may be adjusted according to the intensity of the X-ray.

Therefore, the control circuit 110 may regard the grayscale value of the first image as the basis for sensing the X-ray 310 and may adjust the pulse width of the reset control signal Vctrl2 according to the intensity of the X-ray 310 when obtaining the second image to determine the voltage value of the reset voltage Vrst. For example, if the intensity of the X-ray 310 is not adjusted after the control circuit 110 obtains the first image and still maintains Gy1, the control circuit 110 determines not to adjust the pulse width of the reset control signal Vctrl2 according to the intensity of the X-ray 310. Therefore, the voltage value of the reset voltage Vrst also maintains at V3. On the contrary, if the intensity of the X-ray 310 is enhanced to Gy2 after the control circuit 110 obtains the first image, the control circuit 110 determines to increase the pulse width of the reset control signal Vctrl2 according to the intensity of the X-ray 310 to increase the voltage value of the reset voltage Vrst. Therefore, when the intensity of the X-ray is stronger, the turn-on time of the first transistor element 610 may be adjusted to be longer to increase the voltage value of the reset voltage Vrst. The corresponding relationship among the three parameters of the intensity of the X-ray, the image grayscale value, and the bias voltage of this embodiment is shown in FIG. 4A and FIG. 4B.

Therefore, the control circuit 110 may automatically feedback control the voltage value of the reset voltage Vrst generated by the first transistor element 610 to effectively neutralize the residual charge increased in the photodiode element 210 when the intensity of the X-ray 310 becomes stronger, thereby reducing the delay effect of the second image acquisition.

In summary, in the embodiments of the disclosure, in the process of the dynamic image acquisition of the X-ray device, the control circuit may obtain the light and dark grayscale value of the first image as the basis for sensing the X-ray and then may automatically calculate the appropriate bias voltage or the pulse width of the reset control signal. Therefore, the control circuit may automatically feedback control the bias voltage or reset the voltage to effectively neutralize the residual charge increased in the photodiode element, thereby reducing the delay effect the second image acquisition.

Although the disclosure has been disclosed above by embodiments, they are not intended to limit the disclosure. Anyone with ordinary knowledge in the relevant technical field can make some changes and modifications without departing from the spirit and scope of the disclosure. Therefore, the protection scope of the disclosure shall be determined by the scope of the appended claims.

What is claimed is:

1. A pixel sensor circuit, comprising:

a photodiode element, configured to sense an X-ray and generate a photocurrent signal, wherein the photodiode element has a first end and a second end, and the first end of the photodiode element is applied with a bias voltage; and a transistor element, coupled to the second end of the photodiode element and configured to control the photocurrent signal to be read out, wherein a voltage value of the bias voltage is adjusted according to an intensity of the X-ray by obtaining a grayscale value of a first image as a basis for sensing the X-ray and adjusting the voltage value of the bias voltage according to the intensity of the X-ray when obtaining a second image.

2. The pixel sensor circuit according to claim 1, wherein the first end of the photodiode element is an anode, and the second end of the photodiode element is a cathode.

3. The pixel sensor circuit according to claim 1, wherein the transistor element has a first end, a second end, and a control end, the first end of the transistor element is coupled to the second end of the photodiode element, and the second end of the transistor element is coupled to a data line, and the control end of the transistor element is coupled to a scan line.

4. The pixel sensor circuit according to claim 1, wherein the stronger the intensity of the X-ray, the lower the voltage value of the bias voltage.

5. The pixel sensor circuit according to claim 4, wherein the voltage value of the bias voltage is adjusted between 1 volt and −5 volts.

6. The pixel sensor circuit according to claim 1, wherein a sensing voltage at the second end of the photodiode element and corresponding to the photocurrent signal is read out from a data line and is outputted to a readout circuit.

7. A pixel sensor circuit, comprising:

a photodiode element, configured to sense an X-ray and generate a photocurrent signal, wherein the photodiode element has a first end and a second end, and the first end of the photodiode element is coupled to a first voltage; and a first transistor element, having a first end, a second end, and a control end, wherein the first end of the first transistor element is coupled to the second end of the photodiode element, and the second end of the first transistor element is applied with a bias voltage, wherein a voltage value of the bias voltage is adjusted according to an intensity of the X-ray by obtaining a grayscale value of a first image as a basis for sensing the X-ray and adjusting the voltage value of the bias voltage according to the intensity of the X-ray when obtaining a second image.

8. The pixel sensor circuit according to claim 7, wherein the first end of the photodiode element is an anode, and the second end of the photodiode element is a cathode.

9. The pixel sensor circuit according to claim 7, wherein the control end of the first transistor element is coupled to a reset line, and a reset control signal is applied to the control end of the first transistor element by the reset line, so that the first transistor element generates a reset current corresponding to the bias voltage, and the reset current flows to the photodiode element.

10. The pixel sensor circuit according to claim 9, wherein the bias voltage is reduced, and the reset current is reduced.

11. The pixel sensor circuit according to claim 9, further comprising a second transistor element, wherein the second transistor element has a first end, a second end, and a control end, the first end of the second transistor element is coupled to a data line, the second end of the second transistor element is coupled to a scan line, and the control end of the second transistor element is coupled to the second end of the photodiode element.

12. The pixel sensor circuit according to claim 7, wherein the first voltage is a ground voltage.

13. The pixel sensor circuit according to claim 7, wherein the stronger the intensity of the X-ray, the lower the voltage value of the bias voltage.

14. A pixel sensor circuit, comprising:

a photodiode element, configured to sense an X-ray and generate a photocurrent signal, wherein the photodiode element has a first end and a second end, and the first end of the photodiode element is coupled to a first voltage; and a first transistor element has a first end, a second end, and a control end, wherein the first end of the first transistor element is coupled to the second end of the photodiode element, and the second end of the first transistor element is coupled to a second voltage, wherein a voltage of the first end of the first transistor element is regarded as a reset voltage of the photodiode element, and a voltage value of the reset voltage is adjusted according to an intensity of the X-ray by obtaining a grayscale value of a first image as a basis for sensing the X-ray and adjusting the voltage value of the reset voltage according to the intensity of the X-ray when obtaining a second image.

15. The pixel sensor circuit according to claim 14, wherein the first end of the photodiode element is an anode, and the second end of the photodiode element is a cathode.

16. The pixel sensor circuit according to claim 14, wherein the control end of the first transistor element is coupled to a reset line, and a reset control signal is applied to the control end of the first transistor element by the reset line to control a turn-on time of the first transistor, the voltage value of the reset voltage is determined according to the turn-on time of the first transistor, and the turn-on time of the first transistor is adjusted according to the intensity of the X-ray.

17. The pixel sensor circuit according to claim 16, wherein when the intensity of the X-ray is stronger, the turn-on time of the first transistor is adjusted to be longer.

18. The pixel sensor circuit according to claim 14, further comprising a second transistor element, wherein the second transistor element has a first end, a second end, and a control end, the first end of the second transistor element is coupled to a data line, the second end of the second transistor element is coupled to the second voltage, and the control end of the second transistor element is coupled to the second end of the photodiode element.

19. The pixel sensor circuit according to claim 14, wherein the stronger the intensity of the X-ray, the lower the voltage value of the reset voltage.

20. The pixel sensor circuit according to claim 14, wherein the first voltage is a ground voltage.

* * * * *